(12) United States Patent
Stura et al.

(10) Patent No.: US 11,277,884 B2
(45) Date of Patent: Mar. 15, 2022

(54) AEROSOL-GENERATING DEVICE AND AEROSOL-GENERATING SYSTEM WITH INDUCTIVE HEATING SYSTEM WITH EFFICIENT POWER CONTROL

(71) Applicant: Philip Morris Products S.A., Neuchatel (CH)

(72) Inventors: Enrico Stura, Palezieux-Village (CH); Jerome Christian Courbat, Neuchatel (CH); Oleg Mironov, Cudrefin (CH)

(73) Assignee: Philip Morris Products S.A., Neuchatel (CH)

( * ) Notice: Subject to any disclaimer, the term of this patent is extended or adjusted under 35 U.S.C. 154(b) by 165 days.

(21) Appl. No.: 16/497,483

(22) PCT Filed: Jun. 27, 2018

(86) PCT No.: PCT/EP2018/067264
§ 371 (c)(1),
(2) Date: Sep. 25, 2019

(87) PCT Pub. No.: WO2019/002377
PCT Pub. Date: Jan. 3, 2019

(65) Prior Publication Data
US 2020/0128878 A1    Apr. 30, 2020

(30) Foreign Application Priority Data

Jun. 30, 2017   (EP) .................................. 17179170.0

(51) Int. Cl.
*H05B 6/06*       (2006.01)
*A24F 40/90*      (2020.01)
(Continued)

(52) U.S. Cl.
CPC ............... *H05B 6/06* (2013.01); *A24F 40/40* (2020.01); *A24F 40/50* (2020.01); *A24F 40/90* (2020.01);
(Continued)

(58) Field of Classification Search
CPC .. A61C 13/028; B23K 3/0338; B23K 3/0353; H05B 3/02
(Continued)

(56) References Cited

U.S. PATENT DOCUMENTS 5,613,505 A * 3/1997 Campbell .............. H05B 6/365
                                                         131/194
5,902,501 A * 5/1999 Nunnally .................. A24D 1/20
                                                         219/263
(Continued)

FOREIGN PATENT DOCUMENTS

CN     105307524 A    2/2016
CN     105992528 A    10/2016
(Continued)

OTHER PUBLICATIONS

International Search Report and Written Opinion dated Aug. 16, 2018 in PCT/EP2018/067264 filed on Jun. 27, 2018.
(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating device is provided, including one or more DC power sources; a load network including an inductor and a capacitor connected in series; first drive circuitry connected to the DC power source(s) and across the network and being configured to provide a first voltage drop across the network; second drive circuitry connected to the DC power source(s) and across the network and being
(Continued)

configured to provide a second voltage drop across the network, the second voltage drop being in an opposite direction to the first voltage drop; and a controller connected to the first and the second drive circuitry and being configured to control the first and the second drive circuitry so that both the first and the second voltage drops are provided across the network periodically and so that the second voltage drop is not provided across the network simultaneously with the first voltage drop.

15 Claims, 5 Drawing Sheets

(51) Int. Cl.
*A24F 40/40* (2020.01)
*A24F 40/50* (2020.01)
*H02M 3/00* (2006.01)
*H02M 3/335* (2006.01)
*A24F 47/00* (2020.01)
*H02J 7/00* (2006.01)
*A24F 40/20* (2020.01)
*A24F 40/465* (2020.01)

(52) U.S. Cl.
CPC .............. *A24F 47/00* (2013.01); *H02M 3/00* (2013.01); *H02M 3/33507* (2013.01); *A24F 40/20* (2020.01); *A24F 40/465* (2020.01); *H02J 7/0044* (2013.01)

(58) Field of Classification Search
USPC ........................................................ 219/240
See application file for complete search history.

(56) References Cited

U.S. PATENT DOCUMENTS

| | | |
|---|---|---|
| 2003/0033055 A1 | 2/2003 | McRae et al. |
| 2012/0234315 A1 | 9/2012 | Li et al. |
| 2014/0299141 A1 | 10/2014 | Flick |
| 2017/0055585 A1 | 3/2017 | Fursa et al. |
| 2017/0055587 A1 | 3/2017 | Zinovik et al. |
| 2017/0079330 A1 | 3/2017 | Mironov et al. |
| 2017/0172208 A1 | 6/2017 | Mironov |

FOREIGN PATENT DOCUMENTS

| | | |
|---|---|---|
| CN | 106714596 A | 5/2017 |
| JP | 2017-515490 A | 6/2017 |
| JP | 2017-516269 A | 6/2017 |
| RU | 2 135 054 | 8/1999 |
| WO | WO 2013/060781 A1 | 5/2013 |
| WO | WO 2015/177045 A1 | 11/2015 |
| WO | WO 2015/177255 A1 | 11/2015 |
| WO | WO2016/058904 A1 | 4/2016 |

OTHER PUBLICATIONS

Indian Office Action dated Jul. 30, 2021 in Indian Patent Application No. 201917040464, citing documents AO and AP therein, 6 pages.
Combined Chinese Office Action and Search Report dated Aug. 4, 2021 in corresponding Chinese Patent Application No. 201880038322.1 (with English translation), citing documents AA and AO-AQ therein, 12 pages.
Decision to Grant dated Oct. 27, 2021 in Russian Application No. 2019142503 (with Computer Generated English Translation).
Search Report dated Oct. 27, 2021 in Russian Application No. 2019142503 (with Computer Generated English Translation).

* cited by examiner

AEROSOL-GENERATING DEVICE AND AEROSOL-GENERATING SYSTEM WITH INDUCTIVE HEATING SYSTEM WITH EFFICIENT POWER CONTROL

CROSS-REFERENCE TO RELATED APPLICATIONS

This application is a U.S. national stage application of PCT/EP2018/067264, filed on Jun. 27, 2018, which is based upon and claims the benefit of priority from European patent application no. 17179170.0, filed Jun. 30, 2017, the entire contents of each of which are incorporated herein by reference.

TECHNICAL FIELD

The disclosure relates to aerosol-generating systems that operate by heating an aerosol-forming substrate. In particular the invention relates to aerosol-generating systems that use inductive heating.

DESCRIPTION OF THE RELATED ART

One type of aerosol-generating system is a system that heats, but does not combust, tobacco or another nicotine containing aerosol-forming substrate, to generate an aerosol for inhalation. Typically in heated tobacco systems the tobacco or other aerosol-forming substrate is heated by one or more electrically resistive heating elements that are connected to a power supply. These systems need to be small enough to be easily held during use and easily carried by a user between uses. They also need to have their own internal power supply, which is typically a small rechargeable battery.

More recently, there has been interest in using inductive heating to heat tobacco or nicotine containing aerosol-forming substrates in handheld aerosol-generating systems. Inductive heating has a number of potential benefits. In particular, inductive heating allows the electronic components to be separated from the aerosol-generating substrate and the generated aerosol. This allows the system to be more easily cleaned and maintained and has potential benefits in terms of the robustness of the system.

Inductively heated systems operate by providing an inductor with a time varying electrical voltage. This produces a time varying magnetic field, which in turn generates eddy currents and hysteresis losses in a susceptor material that is placed close to or in contact with the aerosol-forming substrate. Joule heating of the susceptor as a result of the induced currents heats the aerosol-forming substrate to produce an aerosol.

One problem with an inductively heated system that is powered by a small battery is ensuring that sufficient power is delivered to the inductor to generate the required heat in the susceptor. It would be desirable to transfer power to the inductor as efficiently as possible and to increase the power transferrable to the inductor.

SUMMARY

In one aspect of the invention, there is provided an aerosol-generating device comprising:
one or more direct current (DC) power sources;
a load network comprising an inductor and a capacitor connected in series;
first drive circuitry connected to the one or more DC power sources and connected across the load network and configured to provide a first voltage drop across the load network;
second drive circuitry connected to the one or more DC power sources and connected across the load network and configured to provide a second voltage drop across the load network, the second voltage drop being in an opposite direction to the first voltage drop; and
a controller connected to the first and second drive circuitry and configured to control the first and second drive circuitry so that both the first and second voltage drops are provided across the load network periodically and so that the second voltage drop is not provided across the load circuit simultaneously with the first voltage drop.

In another aspect of the invention, there is provided an aerosol-generating system comprising an aerosol-generating device as described, and an aerosol-generating article comprising an aerosol-forming substrate, wherein the aerosol-generating article is configured to be received at least partially within the aerosol-generating device.

BRIEF DESCRIPTION OF THE DRAWINGS

Embodiments of the invention will now be described in detail, with reference to the accompanying drawings, in which.

DETAILED DESCRIPTION

Figure 1:
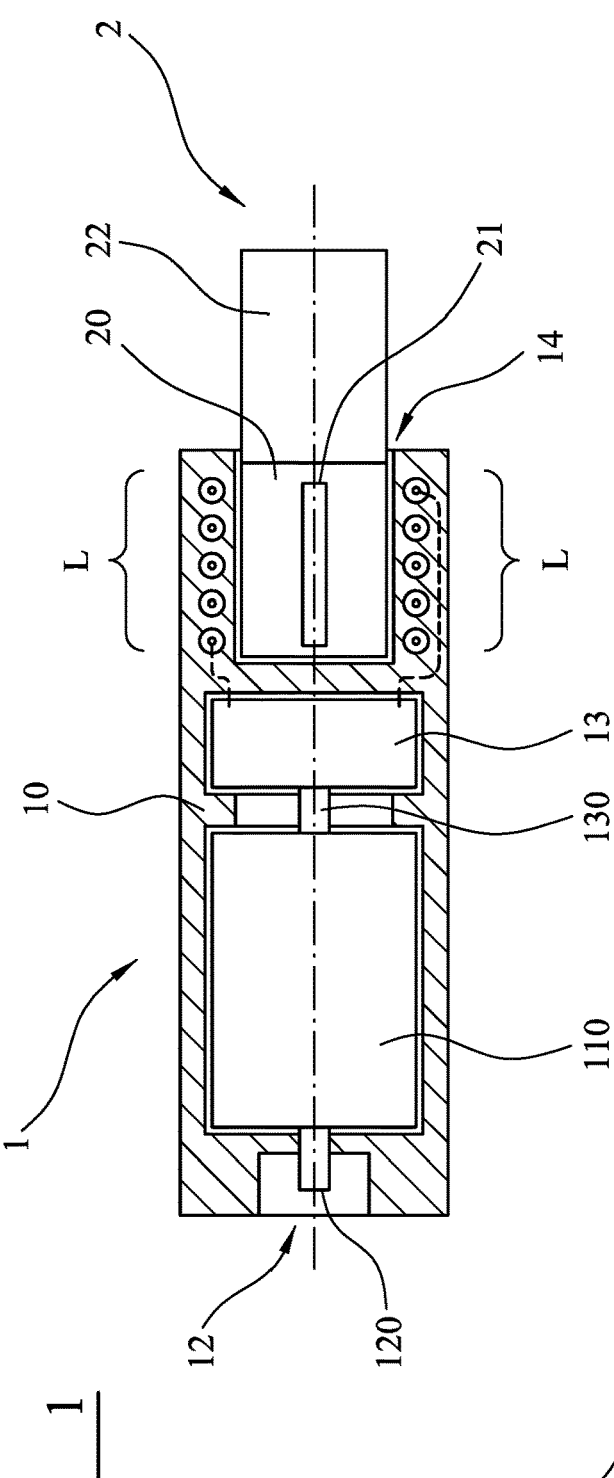
FIG. 1 shows an embodiment of an aerosol-generating system comprising an aerosol-generating device and an aerosol-generating article, in accordance with an embodiment of the invention.

The first driving circuity may have a high voltage side and a low voltage side. The high voltage side may be connected to a first side of the load network. The low voltage may be connected to a second side of the load network. The first driving circuitry is configured to provide a first voltage drop across the load network. The second driving circuitry may also have a high voltage side and a low voltage side. The low voltage side of the second drive circuitry may be connected to first side of the load network. The high voltage side may be connected to the second side of the load network. The second driving circuitry is configured to provide a second voltage drop. The second voltage drop is in an opposite direction to the first voltage drop.

The load network may have a first terminal on a first side and a second terminal on a second side. The first drive circuitry connected to the one or more DC power sources may be connected to the first and second terminals of the load network such that a positive DC voltage from the one or more DC power sources is applied to the first terminal of the load network. This results in a first voltage drop across the load network. The second drive circuitry connected to the one or more DC power sources may be connected to the first and second terminals of the load network such that a positive DC voltage from the one or more DC power sources is applied to the second terminal of the load network. This results in a second voltage drop across the load network. The second voltage drop across the load network is in an opposite direction to the first voltage drop.

For inductive heating it is necessary to provide a time varying voltage across the inductor. The arrangement of first and second drive circuitry alternately supplying voltage drops in different directions across the load network provides a time varying voltage and allows for efficient use of power supplied by the power source or sources.

Advantageously, the controller is configured so that the first voltage drop is provided periodically with a first frequency and so that the second voltage drop is provided periodically with substantially the same frequency. "Substantially the same frequency" in this context means within a few percent of the first frequency, and advantageously within 2 percent of the first frequency. The first and second voltages can then be simply supplied with no overlap between them. The controller may be configured to provide the second voltage directly out of phase with the first voltage.

The first frequency may be a high frequency. In this context, "high frequency" is to be understood to mean a frequency in the range from about 100 Kilohertz (khz) to about 30 Megahertz (MHz). The first frequency may be greater than 1 Mega Hertz. The first frequency may be less than 10 Megahertz. Preferably, the first frequency is in the range between 5 Megahertz and 7 Megahertz.

The first drive circuitry and second drive circuitry may be comprised of right and left side driving means. The circuit components connected to one end of the load network may form the right side driving means and the circuit components connected to the other end of the load network may form the left side driving means. The first drive circuitry may comprise circuit components from both the right and left side driving means. The second drive circuitry may comprise circuit components from both the right and left side driving means. The right and left side driving means may each comprise a switching circuit, which may be a resonant switching circuit. The right side driving means together with the load network may form a first power amplifier. The left side driving means together with the load network may comprise a second power amplifier. The first power amplifier may be a D-class amplifier. The second power amplifier may be a D-class amplifier. The first power amplifier may be an E-class amplifier. The second power amplifier may be an E-class amplifier.

The controller may be configured to provide the first voltage drop as a square waveform voltage. The controller may be configured to provide the second voltage drop as a square waveform voltage. The first voltage drop may be provided with the same or a different duty cycle to the second voltage drop. Advantageously the controller is configured to provide a dead time period of a least a few nanoseconds between the end of one voltage drop and the start of the next voltage drop in the opposite direction, in order to avoid burn out of associated switches in the drive circuitry.

The one or more DC power sources may comprise a single battery connected to both the first and the second drive circuitry. The battery may be a rechargeable battery. The battery may be a lithium ion battery, for example a Lithium-Cobalt, a Lithium-Iron-Phosphate, Lithium Titanate or a Lithium-Polymer battery. Alternatively, the battery may another form of rechargeable battery, such as a Nickel-metal hydride battery or a Nickel cadmium battery.

Alternatively, the one or more DC power sources may comprise two batteries, with one battery connected to the first drive circuitry and another battery connected to the second drive circuitry. The one or more DC power sources may comprise two batteries connected in series with electrical ground being defined between the two batteries so that one battery provides a positive voltage and the other provides a negative voltage.

The controller may comprise a microcontroller. The microcontroller may be any suitable microcontroller but is preferably programmable.

The device may comprise a housing containing the one or more DC power sources, the load network, the first and second drive circuitry and the controller, the housing defining a cavity for receiving an aerosol-forming substrate. The device may be configured to inductively heat the aerosol-forming substrate.

The inductor may be a coil positioned adjacent to or surrounding the cavity. In one embodiment, the inductor is a helical coil that surrounds at least a portion of the cavity. Alternatively, the inductor may be flat spiral inductor coil positioned adjacent to the side or the base, or both the side and the base, of the cavity. The inductor should be positioned to provide a time varying magnetic field in a susceptor material configured to heat an aerosol-forming substrate in use.

The device may comprise a plurality of inductors configured to be activated at different times during operation of the device. The plurality of inductors may be positioned to provide spatially separate (or spatially partially overlapping) time varying magnetic fields so that different portions of an aerosol-forming substrate can be heated at different times during operation. If the device comprises a plurality of inductors, then the device may comprise a plurality of first and second drive circuits.

As used herein, an 'aerosol-generating device' relates to a device that interacts with an aerosol-forming substrate to generate an aerosol. The aerosol-forming substrate may be part of an aerosol-generating article. An aerosol-generating device may be a device that interacts with an aerosol-forming substrate of an aerosol-generating article to generate an aerosol that is directly inhalable into a user's lungs thorough the user's mouth. The aerosol-forming substrate may be fully or partially contained within the device.

The aerosol-forming substrate may be a solid aerosol-forming substrate. Alternatively, the aerosol-forming substrate may be a liquid or may comprise both solid and liquid components or may comprise a gel. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

During operation, the aerosol-forming substrate may be completely contained within the aerosol-generating device. In that case, a user may puff on a mouthpiece of the aerosol-generating device. Alternatively, during operation an aerosol-forming article containing the aerosol-forming substrate may be partially contained within the aerosol-generating device. In that case, the user may puff directly on the aerosol-forming article.

The aerosol-forming article may be substantially cylindrical in shape. The aerosol-forming article may be substantially elongate. The aerosol-forming article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-forming article may have a total length between approximately 30 mm and approximately 100 mm. The aerosol-forming article may have an external diameter between approximately 5 mm and approximately 12 mm. The aerosol-forming article may comprise a filter plug. The filter plug may be located at the downstream end of the aerosol-forming article. The filter plug may be a cellulose acetate filter plug. The filter plug is approximately 7 mm in length in one embodiment, but may have a length of between approximately 5 mm to approximately 10 mm.

In one embodiment, the aerosol-forming article has a total length of approximately 45 mm. The aerosol-forming article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The aerosol-forming article may comprise an outer paper wrapper. Further, the aerosol-forming article may comprise a separation between the aerosol-forming substrate and the filter plug. The separation may be approximately 18 mm, but may be in the range of approximately 5 mm to approximately 25 mm.

The device is preferably a portable or handheld device that is comfortable to hold between the fingers of a single hand. The device may be substantially cylindrical in shape and has a length of between 70 and 200 mm. The maximum diameter of the device is preferably between 10 and 30 mm. In one embodiment the device has a polygonal cross section and has a protruding button formed on one face. In this embodiment, the diameter of the device is between 12.7 and 13.65 mm taken from a flat face to an opposing flat face; between 13.4 and 14.2 taken from an edge to an opposing edge (i.e., from the intersection of two faces on one side of the device to a corresponding intersection on the other side), and between 14.2 and 15 mm taken from a top of the button to an opposing bottom flat face.

The aerosol-generating article may comprise a susceptor element or elements. Alternatively, or in addition, the aerosol generating device may comprise a susceptor element or elements. As used herein, a "susceptor element" means a conductive element that heats up when subjected to a changing magnetic field. This may be the result of eddy currents induced in the susceptor element and/or hysteresis losses. Advantageously the susceptor element comprises a ferromagnetic material.

The susceptor element is advantageously in thermal proximity to the aerosol-forming substrate in use, so that heat generated in the susceptor can be transferred by conduction or convection to the aerosol-forming substrate in order to generate an aerosol.

The material and the geometry for the susceptor element can be chosen to provide a desired electrical resistance and heat generation. Advantageously, the susceptor element has a relative permeability between 1 and 40000. When a reliance on eddy currents for a majority of the heating is desirable, a lower permeability material may be used, and when hysteresis effects are desired then a higher permeability material may be used. Preferably, the material has a relative permeability between 500 and 40000. This provides for efficient heating.

The material of the susceptor element may be chosen because of its Curie temperature. Above its Curie temperature a material is no longer ferromagnetic and so heating due to hysteresis losses no longer occurs. In the case the susceptor element is made from one single material, the Curie temperature may correspond to a maximum temperature the susceptor element should have (that is to say the Curie temperature is identical with the maximum temperature to which the susceptor element should be heated or deviates from this maximum temperature by about 1-3%). This reduces the possibility of rapid overheating.

If the susceptor element is made from more than one material, the materials of the susceptor element can be optimized with respect to further aspects. For example, the materials can be selected such that a first material of the susceptor element may have a Curie temperature which is above the maximum temperature to which the susceptor element should be heated. This first material of the susceptor element may then be optimized, for example, with respect to maximum heat generation and transfer to the aerosol-forming substrate to provide for an efficient heating of the susceptor on one hand. However, the susceptor element may then additionally comprise a second material having a Curie temperature which corresponds to the maximum temperature to which the susceptor should be heated, and once the susceptor element reaches this Curie temperature the magnetic properties of the susceptor element as a whole change. This change can be detected and communicated to a microcontroller which then interrupts the operation of the drive circuitry until the temperature has cooled down below the Curie temperature again, whereupon operation of the drive circuitry can be resumed.

The susceptor element may be in the form of a mesh. If the aerosol-forming substrate is a liquid, the mesh may be configured to allow the liquid to form a meniscus in the interstices of the mesh susceptor element. This provides for efficient heating of the aerosol-forming substrate. As used herein the term "mesh" encompasses grids and arrays of filaments having spaces therebetween, and may include woven and non-woven fabrics. The mesh may comprise a plurality of ferrite filaments. The filaments may define interstices between the filaments and the interstices may have a width of between 10 μm and 100 μm. Preferably the filaments give rise to capillary action in the interstices, so that in use, liquid to be vaporised is drawn into the interstices, increasing the contact area between the susceptor element and the liquid.

FIG. 1 shows an embodiment of an aerosol-generating system comprising an inductive heating device according to the invention. The inductive heating device 1 comprises a device housing 10, which can be made of plastic, and a DC power source comprising a rechargeable battery 110. Inductive heating device 1 further comprises a docking port 12 comprising a pin 120 for docking the inductive heating device to a charging station or charging device for recharging the rechargeable battery 110. Still further, inductive heating device 1 comprises a power supply electronics 13 which is configured to operate at a desired frequency.

Power supply electronics 13 is electrically connected to the rechargeable battery 110 through a suitable electrical connection 130. And while the power supply electronics 13 comprises additional components which cannot be seen in FIG. 1, it comprises in particular an LC load network which in turn comprises an inductor L, this being indicated by the dashed lines in FIG. 1. Inductor L is embedded in the device housing 10 at the proximal end of device housing 10 to surround a cavity 14 which is also arranged at the proximal end of the device housing 10.

Inductor L may comprise a helically wound cylindrical inductor coil having a cylindrical shape. The helically wound cylindrical inductor coil L may have a diameter d in the range of about 5 mm to about 10 mm, and in particular the diameter d may be about 8 mm. The length 1 of the helically wound cylindrical inductor coil may be in the range of about 0.5 mm to about 18 mm. The inner volume accordingly, may be in the range of about 0.015 cm$^3$ to about 1.3 cm$^3$.

The aerosol-forming substrate 20 comprises a susceptor 21 and is accommodated in the cavity 14 at the proximal end of the device housing 10 such that during operation the inductor L (the helically wound cylindrical inductor coil) is inductively coupled to the susceptor 21 of the aerosol-forming substrate 20 of smoking article 2.

The susceptor 21 does not necessarily have to form part of the consumable, but it could be part of the device itself. It is also possible to have susceptor elements in both the device and in the consumable.

A filter portion 22 of the smoking article 2 may be arranged outside the cavity 14 of the inductive heating device 1 so that during operation the consumer may draw the aerosol through the filter portion 22. Once the smoking article is removed from the cavity 14, the cavity 14 can be easily cleaned, since except for the open distal end through which the aerosol-forming substrate 20 of the smoking article 2 is to be inserted, the cavity is fully closed and surrounded by the inner walls of the plastic device housing 10 defining the cavity 14.

Figure 2:
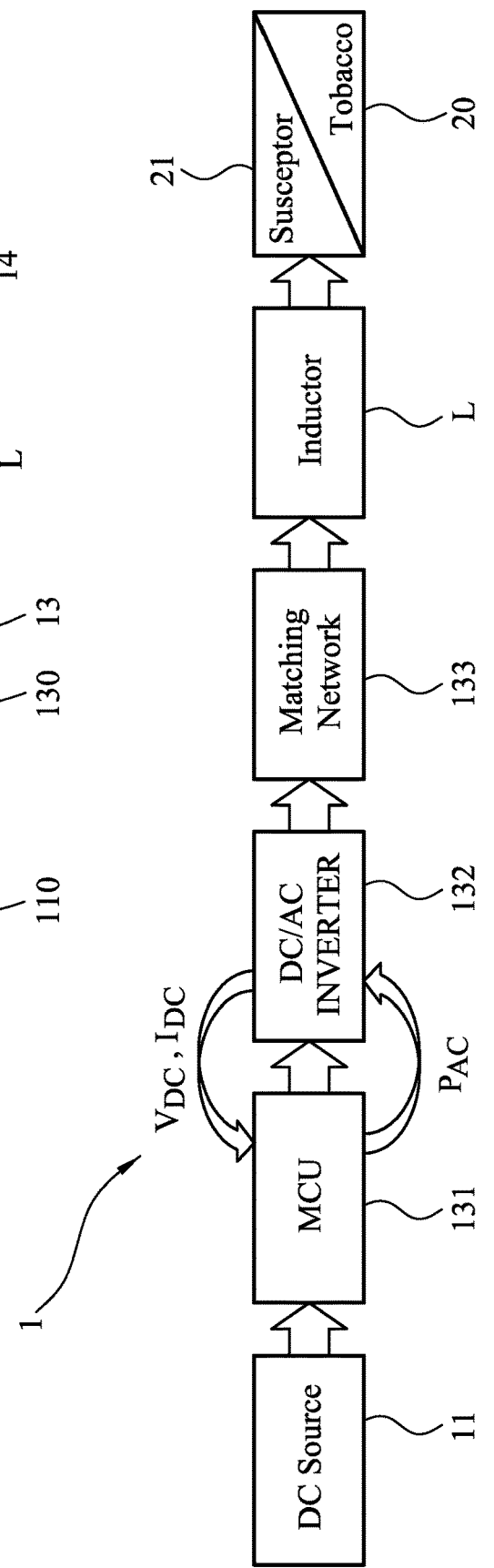
FIG. 2 is a schematic illustration of the components of the electrical components of the system shown in FIG. 1.

FIG. 2 shows a block diagram of an embodiment of the aerosol-delivery system comprising the inductive heating device 1 according to the invention, with some optional aspects or components as will be discussed below. Inductive heating device 1 together with the aerosol-forming substrate 20 comprising the susceptor 21 forms an embodiment of the aerosol-delivery system according to the invention. The block diagram shown in FIG. 2 is an illustration taking the manner of operation into account. As can be seen, the inductive heating device 1 comprises a DC power source 11 (in FIG. 1 comprising the rechargeable battery 110), control electronics (microprocessor control unit) 131, a DC/AC converter 132 (embodied as a DC/AC inverter), a matching network 133 for adaptation to the load, and the inductor L. Control electronics 131, DC/AC converter 132 and matching network 133 as well as inductor L are all part of the power supply electronics 13 (see FIG. 1).

The DC supply voltage (VDC) and the DC current (IDC) drawn from the DC power source 11 are provided by feed-back channels to the microprocessor control unit 131, preferably by measurement of both the DC supply voltage (VDC) and the DC current (IDC) drawn from the DC power source 11, to control the further supply of AC power to the LC load network. The matching network 133 may be provide for optimal adaption to the load, but it is not essential and is not included in the description of the following detailed examples.

Figure 3:
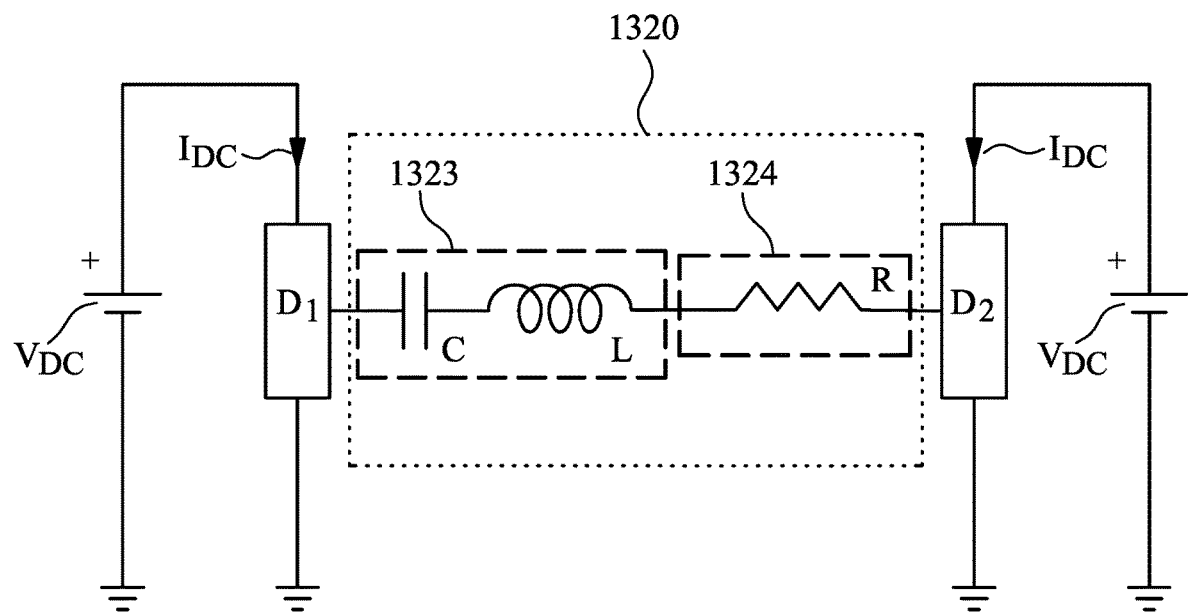
FIG. 3 is a schematic illustration of the power supply electronics in accordance with the invention.

FIG. 3 shows some essential components of the power supply electronics 13 and in particular the DC/AC inverter 132. The power electronics 13 comprises a load branch 1320 which in turn comprises a LC load network 1323 configured to operate at a low load R 1324. The resistance R 1234 shown in FIG. 3 is not a real component; it is an equivalent series resistance, of the susceptor in the coil. The LC load network comprises a capacitor C and an inductor L (having an ohmic resistance Rcoil) connected in series. The LC load network 1323 is inductively coupled to the susceptor during operation.

In this embodiment, the DC/AC inverter comprises a left driving means $D_1$ and a right driving means $D_2$ connected to opposite ends of the load network 1320. Each of the left driving means and right driving means is connected to the DC power source and to the load network 1320 which has a first terminal on a first side and a second terminal on a second side. In FIG. 3 two separate DC power sources are depicted, but typically the left and right driving means are both connected to the same power source.

The left driving means $D_1$ is configured to provide a first periodic waveform voltage $V_R$ to the load branch 1320, with a selected frequency F, and having an amplitude ranging from a first value to a second value lower than the first value. In a similar manner, right driving means $D_2$ is configured to provide a second waveform voltage $V_L$ to the load branch 1320, having substantially the same frequency F as the first waveform voltage, and similarly having an amplitude ranging from a first respective value to a second respective value lower than the first value.

Figure 4:
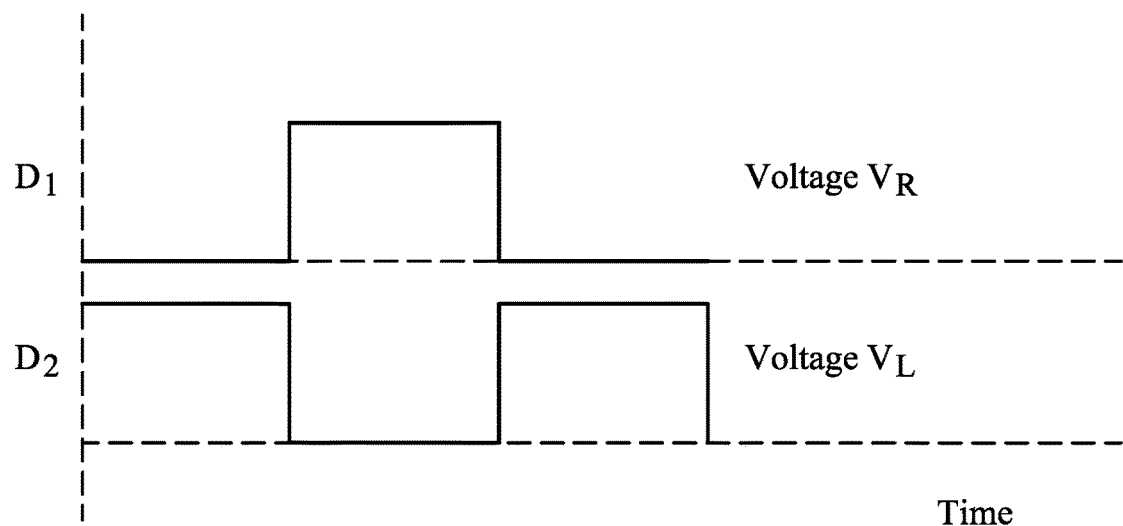
FIG. 4 illustrates the voltages applied to opposite sides of the load circuit by the drive circuitry.

An example of the first and second periodic waveforms is illustrated schematically in FIG. 4. It can be seen that the two waveforms are square waves that are directly out of phase (or in phase opposition) with one another. Because the square waves are applied from opposite ends of the load network, they provide voltage drops across the load network in opposite directions. The voltage drops are of opposite polarity to one another, where opposite polarity in this context refers to the relative position of the high and low voltage sides, rather than requiring a positive voltage and a negative voltage. By applying voltage pulses alternately from either side of the load network in this way, an AC voltage is effectively supplied to the inductor and power can be efficiently dissipated in the load network, and in particular in the susceptor element.

Figure 5A:
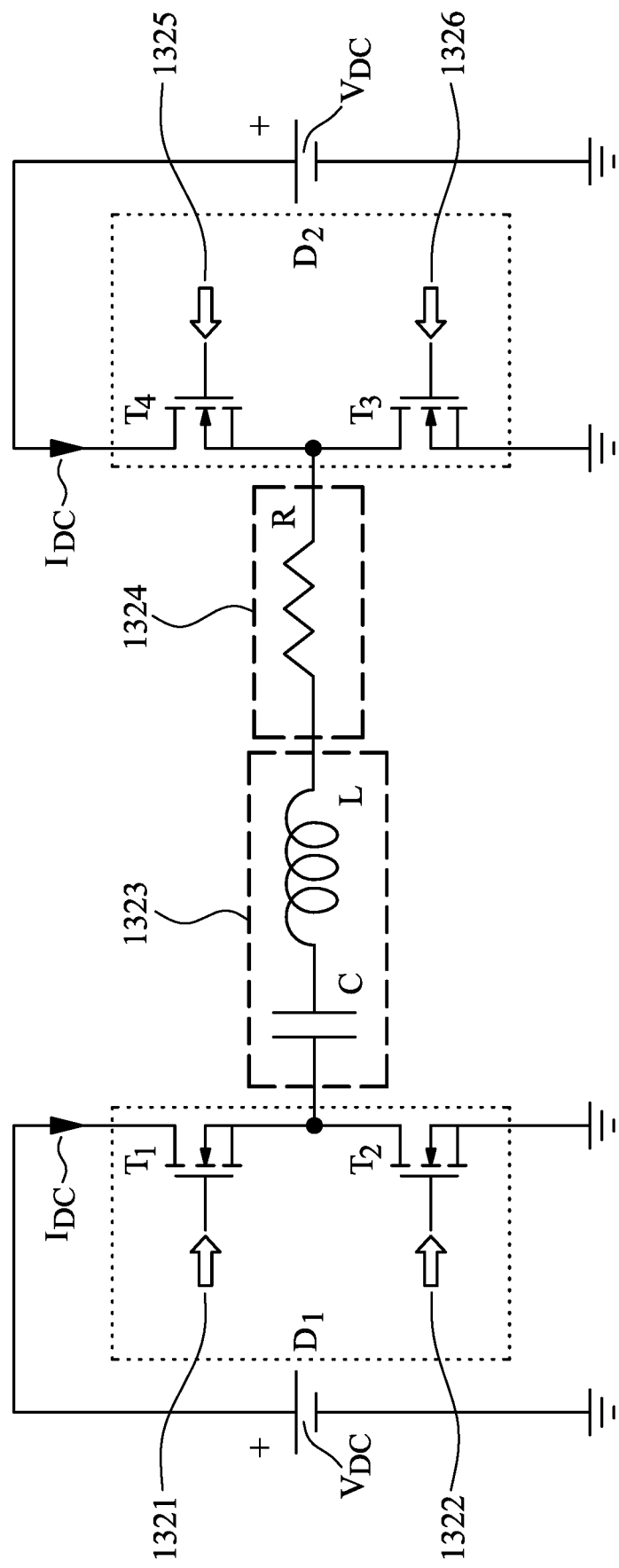
FIG. 5a illustrates an arrangement of the power supply electronics in accordance with an embodiment of the invention.

There are a number of ways in which the arrangement shown in FIG. 3 can be implemented to provide a voltage profile as illustrated in FIG. 4. FIG. 5a illustrates a first embodiment, in which the right and left driving means together with the load network form Class-D amplifiers. In particular, each of the driving means comprise a pair of transistor switches $T_1$, $T_2$, and $T_3$, $T_4$ connected to the DC power source in series. The load network 1323 is connected to the left driving means at a position between the two transistor switches $T_1$ and $T_2$. The load network 1323 is connected to the right driving means at a position between the two transistor switches $T_3$ and $T_4$. The load network is effectively shared between the two Class-D amplifiers.

Figure 5B:
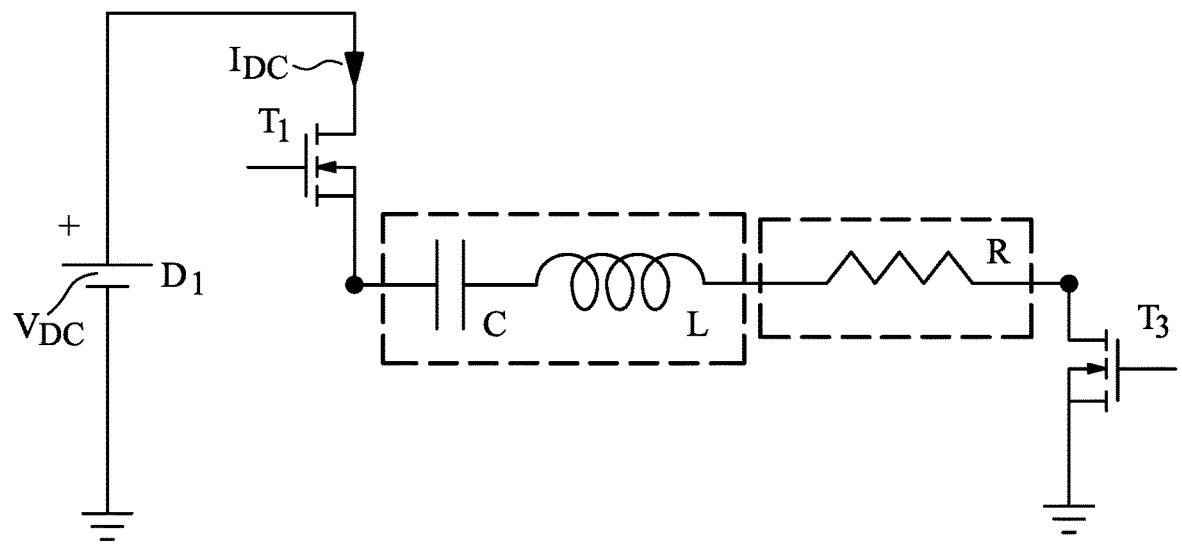
FIG. 5b illustrates the components of the power supply circuit of FIG. 5a through which current passes during a first time period.
Figure 5C:
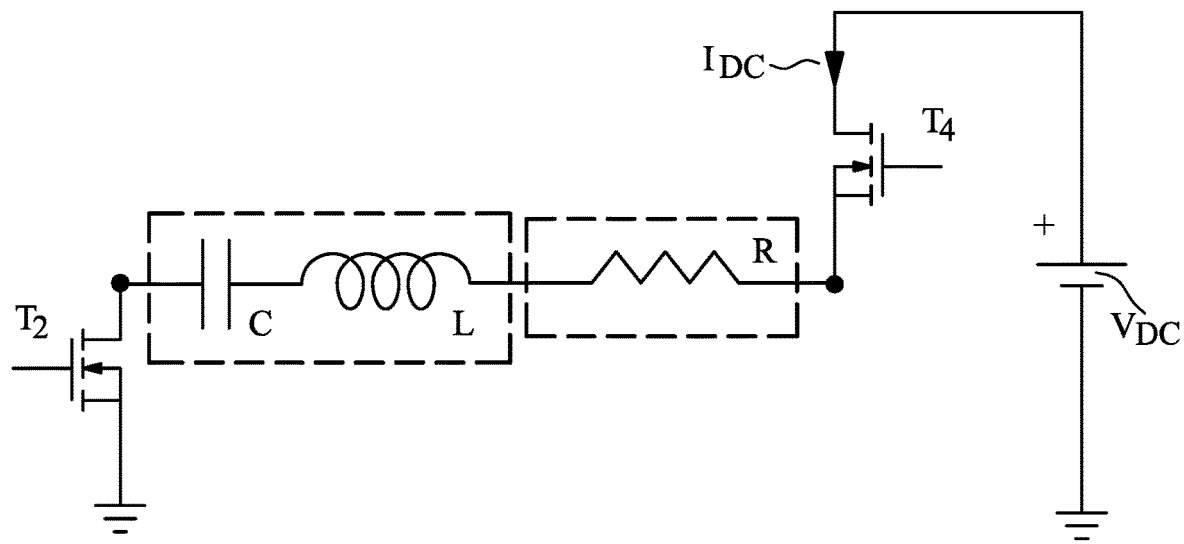
FIG. 5c illustrates the components of the power supply circuit of FIG. 5a through which current passes during a second time period.

The transistor switches are Field Effect Transistors (FETs) and controlled by the control electronics to supply waveform as illustrated in FIG. 4. The control electronics supplies a high frequency alternating switching voltage 1321, 1322, 1325, 1326 to the gate of each of the transistors so that during one half period the transistors $T_1$ and $T_3$ are conducting and transistors $T_2$ and $T_4$ are off, and during the other half period transistors $T_2$ and $T_4$ are conducting and transistors $T_1$ and $T_3$ are off. FIG. 5b illustrates the connection of the inductor L to the power supply during the first half period, with transistors $T_1$ and $T_3$ conducting. The arrangement shown in FIG. 5b can be considered to comprise first drive circuitry that operates to supply the load network with a first periodic voltage drop. FIG. 5c illustrates the connection of the inductor L to the power supply during the second half period, with transistors $T_2$ and $T_4$ conducting. The arrangement shown in FIG. 5c can be considered to comprise second drive circuitry that operates to supply the load network with a second periodic voltage drop, at the same frequency as the first periodic voltage drop but of opposite polarity and directly out of phase with the first periodic voltage.

It is of course possible to provide periodic voltage drops that are different to those shown in FIG. 4. In particular, the waveforms may have a duty cycle of less than 50%. It will be appreciated that voltage pulses $V_R$ and $V_L$ preferably do not overlap each other in time, in order to avoid high and potentially damaging current going through transistors $T_1$ and $T_2$ or $T_3$ and $T_4$.

Figure 6:
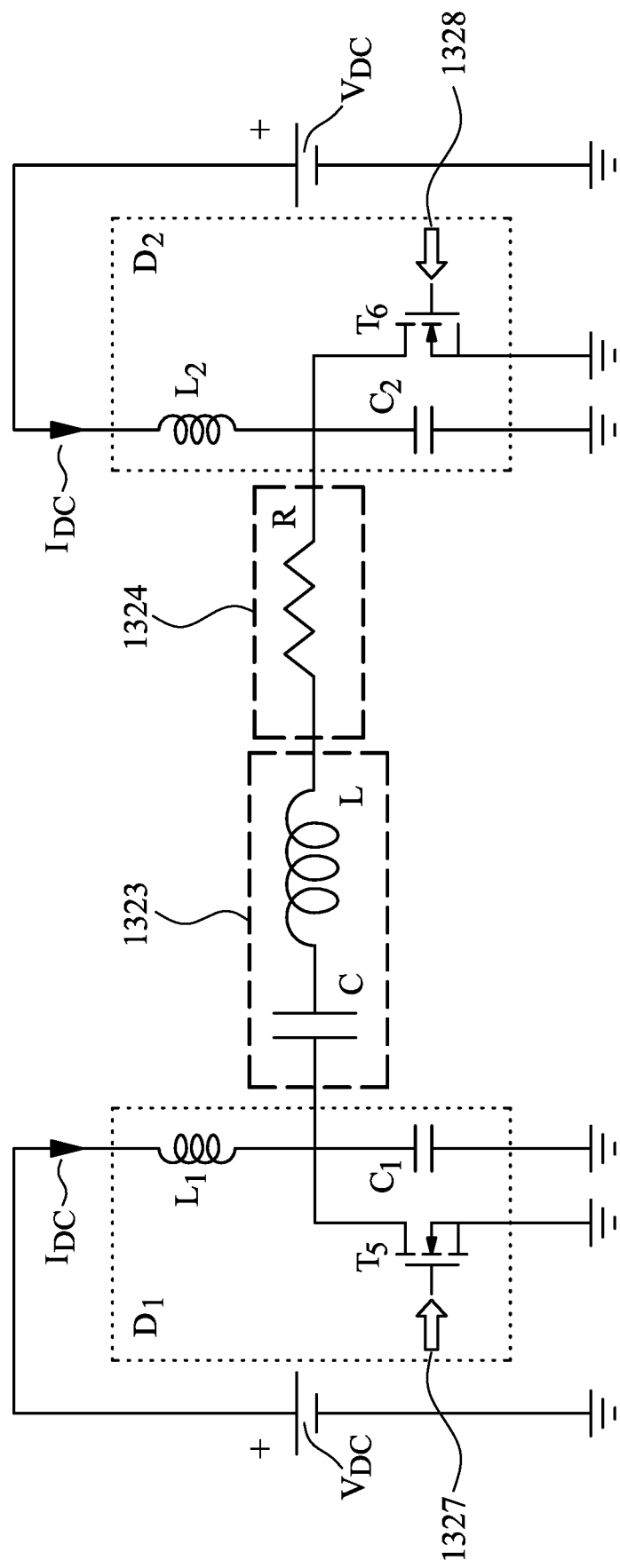
FIG. 6 illustrates an alternative arrangement of the power supply electronics.

FIG. 6 illustrates an alternative arrangement for implementing the topology shown in FIG. 3, using an Class-E amplifier topology in place of a Class-D amplifier topology. In the arrangement of FIG. 6, the left side driving means together with the load network forms a first Class-E amplifier and the right side driving means together with the load network forms a second Class-E amplifier. Each Class-E amplifier comprises a single FET switch. The switch $T_5$ in the left side driving means is controlled by a high frequency switching voltage 1327 and the switch $T_6$ in the right side driving means is controlled by a high frequency switching voltage 1328. The switching voltages 1327 and 1328 are out of phase with one another to provide the two, directly out of phase periodic voltage waveforms $V_L$ and $V_R$, as exemplified in FIG. 4.

It should be clear that other forms of drive circuitry are possible. For example, it is possible to have an arrangement using the right side driving means shown in FIG. 5a and the left side driving means shown in FIG. 6, or using the left side driving means shown in FIG. 5a and the right side driving means shown in FIG. 6. Other forms of resonant switching circuitry may be employed as the right and left side driving means too.

The invention claimed is:

1. An aerosol-generating device, comprising:
   one or more DC power sources;
   a load network comprising an inductor and a capacitor connected in series;
   first drive circuitry connected to the one or more DC power sources and connected across the load network and being configured to provide a first voltage drop across the load network;
   second drive circuitry connected to the one or more DC power sources and connected across the load network and being configured to provide a second voltage drop across the load network, the second voltage drop being in an opposite direction to the first voltage drop; and
   a controller connected to the first and the second drive circuitry and being configured to control the first and the second drive circuitry so that both the first and the second voltage drops are provided across the load network periodically and so that the second voltage drop is not provided across the load network simultaneously with the first voltage drop.

2. The aerosol-generating device according to claim 1, wherein the controller is further configured so that the first voltage is provided periodically with a first frequency and so that the second voltage is provided periodically at substantially a same frequency as the first frequency.

3. The aerosol-generating device according to claim 1, wherein the first drive circuitry and the second drive circuitry are composed of right and left side driving means, wherein circuit components connected to one end of the load network form the right side driving means and circuit components connected to the other end of the load network form the left side driving means, and wherein each of the right and the left side driving means comprise a switching circuit.

4. The aerosol-generating device according to claim 3, wherein the right side driving means together with the load network forms a first power amplifier, and wherein the left side driving means together with the load network forms a second power amplifier.

5. The aerosol-generating device according to claim 4, wherein the first power amplifier or the second power amplifier, or both the first power amplifier and the second power amplifier, is a D-class amplifier.

6. The aerosol-generating device according to claim 4, wherein the first power amplifier or the second power amplifier, or both the first power amplifier and the second power amplifier, is an E-class amplifier.

7. The aerosol-generating device according to claim 1, wherein the controller is further configured to provide the second voltage directly out of phase with the first voltage.

8. The aerosol-generating device according to claim 1, wherein the one or more DC power sources comprises a battery connected to both the first and the second drive circuitry.

9. The aerosol-generating device according to claim 8, wherein the battery is a rechargeable battery.

10. The aerosol-generating device according to claim 1, further comprising a housing containing the one or more DC power sources, the load network, the first and the second drive circuitry, and the controller, wherein the housing defines a cavity configured to receive an aerosol-forming substrate, and wherein the aerosol-generating device is configured to inductively heat the aerosol-forming substrate.

11. The aerosol-generating device according to claim 10, wherein the inductor is a coil positioned adjacent to or surrounding the cavity.

12. The aerosol-generating device according to claim 1, wherein the aerosol-generating device is a handheld device.

13. An aerosol-generating system comprising an aerosol-generating device according to claim 1 and an aerosol-generating article comprising an aerosol-forming substrate, wherein the aerosol-generating article is configured to be received at least partially within the aerosol-generating device.

14. The aerosol-generating system according to claim 13, wherein the aerosol-generating article comprises a susceptor material.

15. The aerosol-generating system according to claim 13, wherein the aerosol-forming substrate comprises a tobacco-containing material containing volatile tobacco flavour compounds, which are released from the substrate upon heating.

* * * * *